United States Patent
Cress et al.

(10) Patent No.: US 8,127,899 B2
(45) Date of Patent: Mar. 6, 2012

(54) TORQUE PADS FOR AIRCRAFT BRAKE SYSTEMS AND AIRCRAFT BRAKE SYSTEM INCLUDING SAME

(75) Inventors: James J. Cress, Mishawaka, IN (US); Charles F. Sarver, Bremen, IN (US)

(73) Assignee: Honeywell International Inc., Morristown, NJ (US)

( * ) Notice: Subject to any disclaimer, the term of this patent is extended or adjusted under 35 U.S.C. 154(b) by 287 days.

(21) Appl. No.: 11/708,640

(22) Filed: Feb. 21, 2007

(65) Prior Publication Data

US 2008/0196982 A1    Aug. 21, 2008

(51) Int. Cl.
F16D 69/00    (2006.01)
F16D 65/12    (2006.01)

(52) U.S. Cl. .............. 188/250 B; 188/73.1; 188/250 G

(58) Field of Classification Search .............. 188/71.5, 188/234, 250 B, 250 G, 218 XL, 18 A, 73.2, 188/73.31, 73.1; 244/111, 110 R, 110 A
See application file for complete search history.

(56) References Cited

U.S. PATENT DOCUMENTS

| | | | |
|---|---|---|---|
| 4,878,563 A | | 11/1989 | Baden et al. |
| 5,551,534 A | * | 9/1996 | Smithberger et al. ........ 188/71.5 |
| 5,588,507 A | | 12/1996 | Beardsley et al. |
| 6,029,781 A | * | 2/2000 | Carrier ........................ 188/71.5 |
| 6,340,075 B1 | * | 1/2002 | Bok et al. ..................... 188/71.7 |
| 6,756,140 B1 | * | 6/2004 | McAlister ........................ 429/20 |
| 7,104,366 B2 | * | 9/2006 | McAfee et al. ............. 188/71.5 |
| 2004/0154880 A1 | | 8/2004 | Guaraldo |
| 2008/0142314 A1 | * | 6/2008 | Scelsi et al. .................. 188/73.1 |

FOREIGN PATENT DOCUMENTS

| | | |
|---|---|---|
| EP | 1 084 949 A2 | 3/2001 |
| JP | 4248030 A * | 9/1992 |
| WO | WO-94/13973 | 6/1994 |
| WO | WO-02/16793 A1 | 2/2002 |

OTHER PUBLICATIONS

Extended European Search Report from corresponding EP Application No. 08101767.5, mailed Jun. 20, 2008, 4 pages.
Communication from corresponding EP Application No. 08101767. 5, mailed Oct. 8, 2008, 2 pages.
Response to EP Communication, from corresponding EP Application No. 08101767.5, dated Feb. 11, 2009, 9 pages.
Communication from corresponding EP Application No. 08101767. 5, mailed May 13, 2009, 21 pages.

* cited by examiner

Primary Examiner — Melody M Burch
(74) Attorney, Agent, or Firm — Shumaker & Sieffert, P.A.

(57) ABSTRACT

An aircraft brake system (42) includes a torque tube (44), a plurality of spaced stators (48) mounted on the torque tube (44), a wheel (40) surrounding the torque tube (44) and a plurality of rotors (50) connected to the wheel (40) and projecting into the spaces between adjacent ones of the stators (48). A backing plate (52) mounted on the torque tube (44) has a first side (54) facing the rotors (50) and a second side (56) facing away from the rotors (50), and the second side (56) includes a plurality of keyways (58). A plurality of torque pads (10, 70, 100, 120) are connected to the torque tube (44), each having a body (12, 72, 102, 122) with a first surface (14, 74, 104, 124) contacting the second side (56) of the backing plate (52) and at least one key (22, 82, 112, 114, 130, 132) projecting from the first surface (14, 74, 104, 124) into one of the plurality of keyways (58). Also a torque pad (10, 70, 100, 120) and a method of connecting a backing plate to a torque tube.

20 Claims, 7 Drawing Sheets

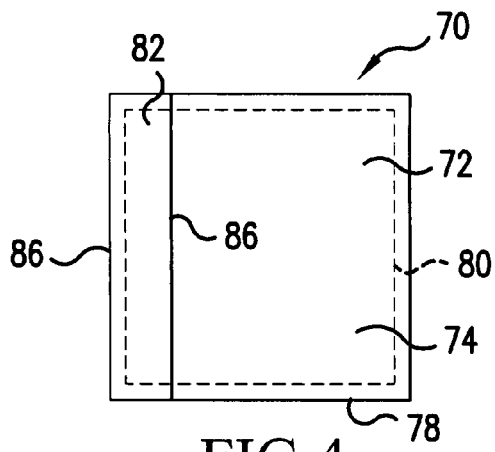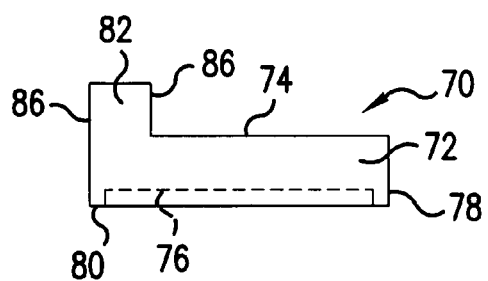
FIG.4　　FIG.5
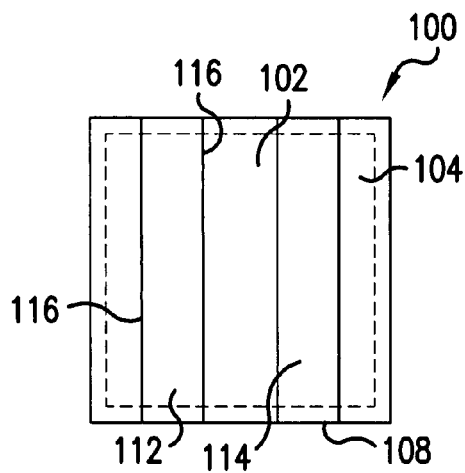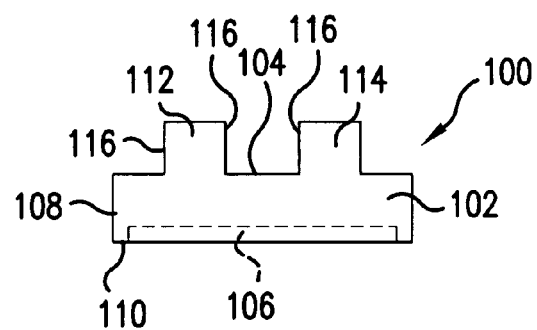
FIG.6　　FIG.7
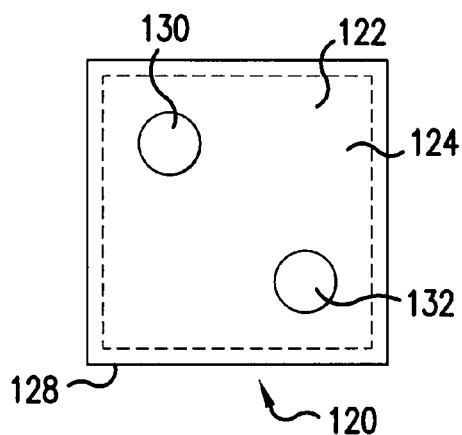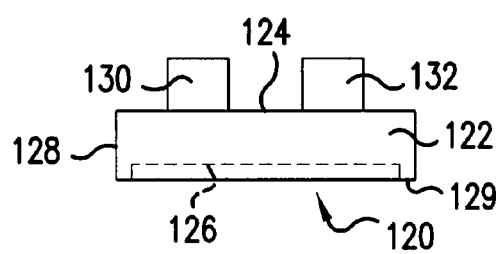
FIG.8　　FIG.9

TORQUE PADS FOR AIRCRAFT BRAKE SYSTEMS AND AIRCRAFT BRAKE SYSTEM INCLUDING SAME

FIELD OF THE INVENTION

The present invention is directed to a torque pad for an aircraft brake system and toward a method of coupling a brake backing plate to a torque tube using a torque pad, and, more specifically, toward a torque pad having a body and a key projecting from a surface of the body and toward a method of coupling a carbon backing plate to a torque tube using such a torque pad.

BACKGROUND OF THE INVENTION

Aircraft brake systems may include a torque tube on which a plurality of stators are mounted with spaces therebetween and a wheel surrounding the torque tube having a plurality of rotors projecting into the spaces between the stators. In modern brake systems, the rotors and stators are often formed from a carbon-carbon composition which may be referred to herein simply as "carbon."

One or more pistons are provided in such braking systems for applying pressure against a first one of the stators to compress the stack of rotors and stators and slow a rotating aircraft wheel. The stator furthest from the pistons may be referred to as a "backing plate" and, because of its shape and position, it is generally attached to the torque tube in a different manner from the other stators. As illustrated in FIGS. 13-17, a conventional aircraft braking system 200 may include a backing plate 202 with a back surface 204 in which a plurality of openings 206 are formed. Conventional torque pads 208 are mounted on a flange 210 of a torque tube 211 and are received in openings 206 in backing plate 202. The torque pads 208 may be mounted on tabs 212 projecting from flange 210 and pinned in place with pins 214 or attached to the torque tube in any other conventional manner. The torque pads 208 thereby couple the backing plate 202 to the torque tube 211 and transfer both axial loads from the pistons (not shown) and torsional loads from the rotating rotors to the torque tube 211. These torque pads must withstand aircraft brake operating temperatures that can reach 1200° F. and withstand (together with the approximately 11 other torque pads present in a conventional brake assembly) axial loads of around 45,000 pounds and torsional loads of around 30,000 foot pounds.

When conventional torque pads are used, the backing plate requires extensive machining to form spaces or pockets for accommodating the torque pads. This design produces an undesirably large amount of scrap because the pockets for the torque pads reduces the strength of the backing plate in the vicinity of the pockets. This lower strength results in local compression and/or distortion of the carbon backing plate. It would therefore be desirable to provide a torque pad capable of coupling a backing plate to a torque tube that requires less extensive machining of the backing plate.

SUMMARY OF THE INVENTION

These problems and others are addressed by the present invention, a first aspect of which comprises an aircraft brake system having a torque tube and a plurality of spaced stators mounted on the torque tube. A wheel surrounds the torque tube, and a plurality of rotors are connected to the wheel and project into the spaces between adjacent ones of the stators. A backing plate has a first side facing the rotors and a second side facing away from the rotors and the second side includes a plurality of keyways. A plurality of torque pads are connected to the torque tube, each torque pad comprising a body having a first surface contacting the second side of the backing plate, and at least one key projects from the first surface into one of the plurality of keyways.

Another aspect of the invention comprises a method of connecting a backing plate having a plurality of keyways in a back surface thereof to a torque tube in an aircraft braking system. The method includes providing a plurality of torque pads each comprising a body having a first surface and a key projecting from the first surface, mounting the torque pads on the torque tube, and mounting the backing plate on the torque tube with the torque pad first surface in contact with the backing plate second surface and the keys inside the keyways.

A further aspect of the invention is an aircraft brake system torque pad formed of a superalloy or high-temperature steel body having a first planar surface adapted to engage a flat surface of a backing plate of a carbon brake stack and at least one key projecting from the first planar surface and adapted to be received in a keyway in the flat surface of the backing plate. The torque pad is configured to fix the backing plate relative to a torque tube when the brake stack is compressed during a braking operation.

BRIEF DESCRIPTION OF THE DRAWINGS

These aspects and features of the invention and others will be better understood after a reading of the following detailed description in connection with the attached drawings wherein:

FIG. 4 is a top plan view of a second embodiment of a torque pad;

FIG. 5 is a side elevational view of the torque pad of FIG. 4;

FIG. 6 is a top plan view of a third embodiment of a torque pad;

FIG. 7 is a side elevational view of the torque pad of FIG. 6;

FIG. 8 is a top plan view of a fourth embodiment of a torque pad;

FIG. 9 is a side elevational view of the torque pad of FIG. 8;

DETAILED DESCRIPTION

Figure 1:
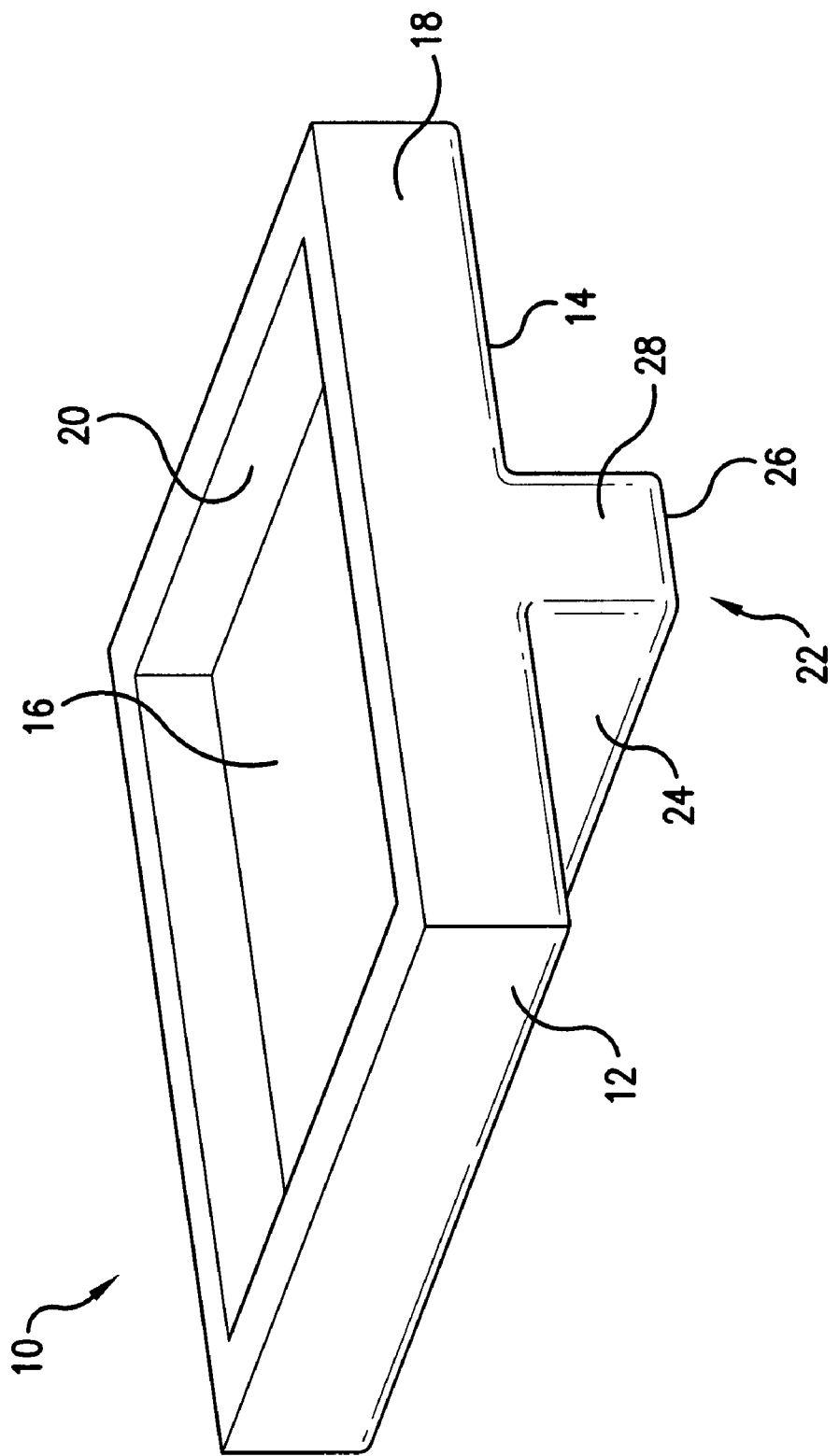
FIG. 1 is a perspective view of a torque pad according to a first embodiment of the present invention.
Figure 2:
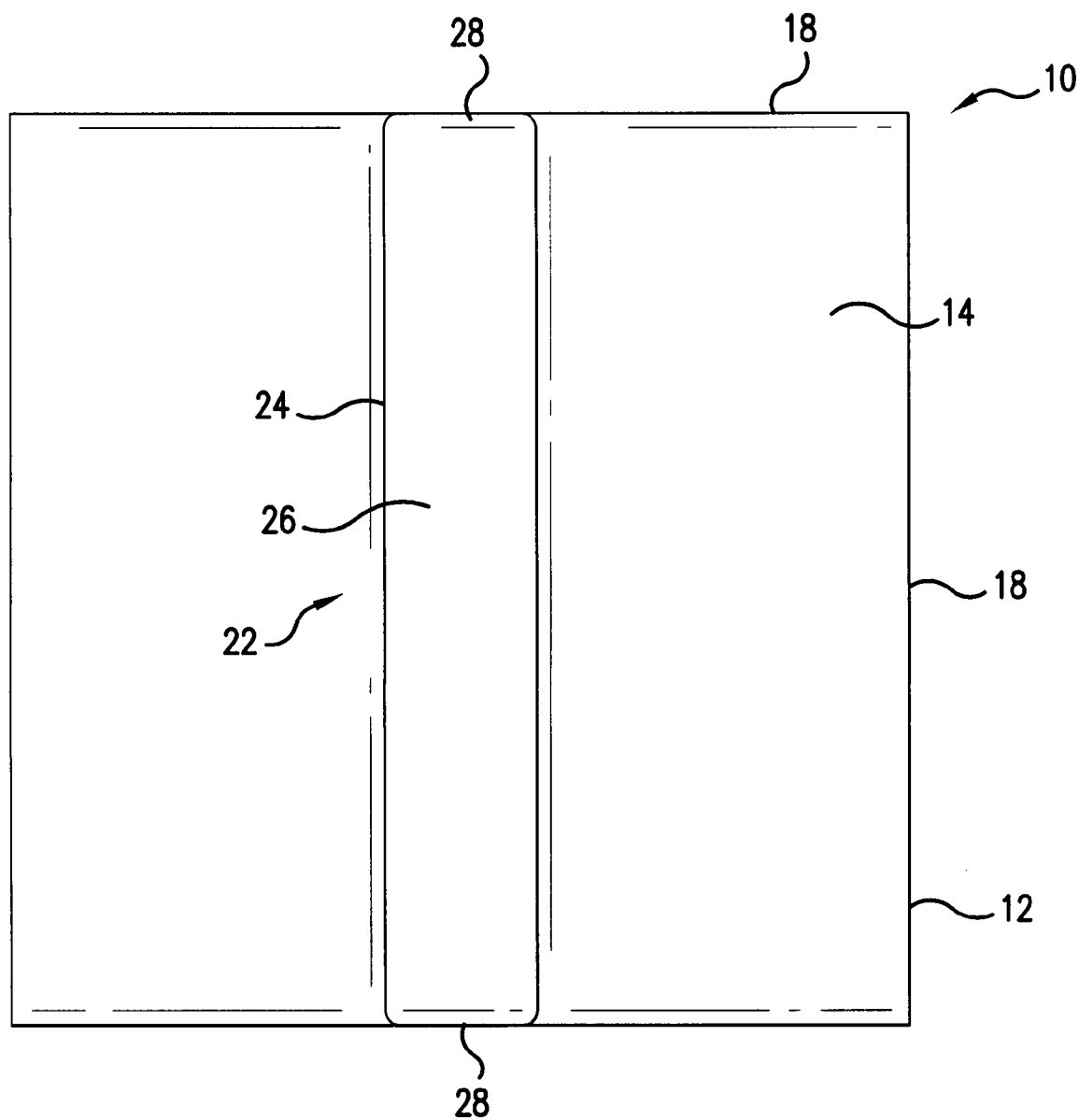
FIG. 2 is a top plan view of the torque pad of FIG. 1.
Figure 3:
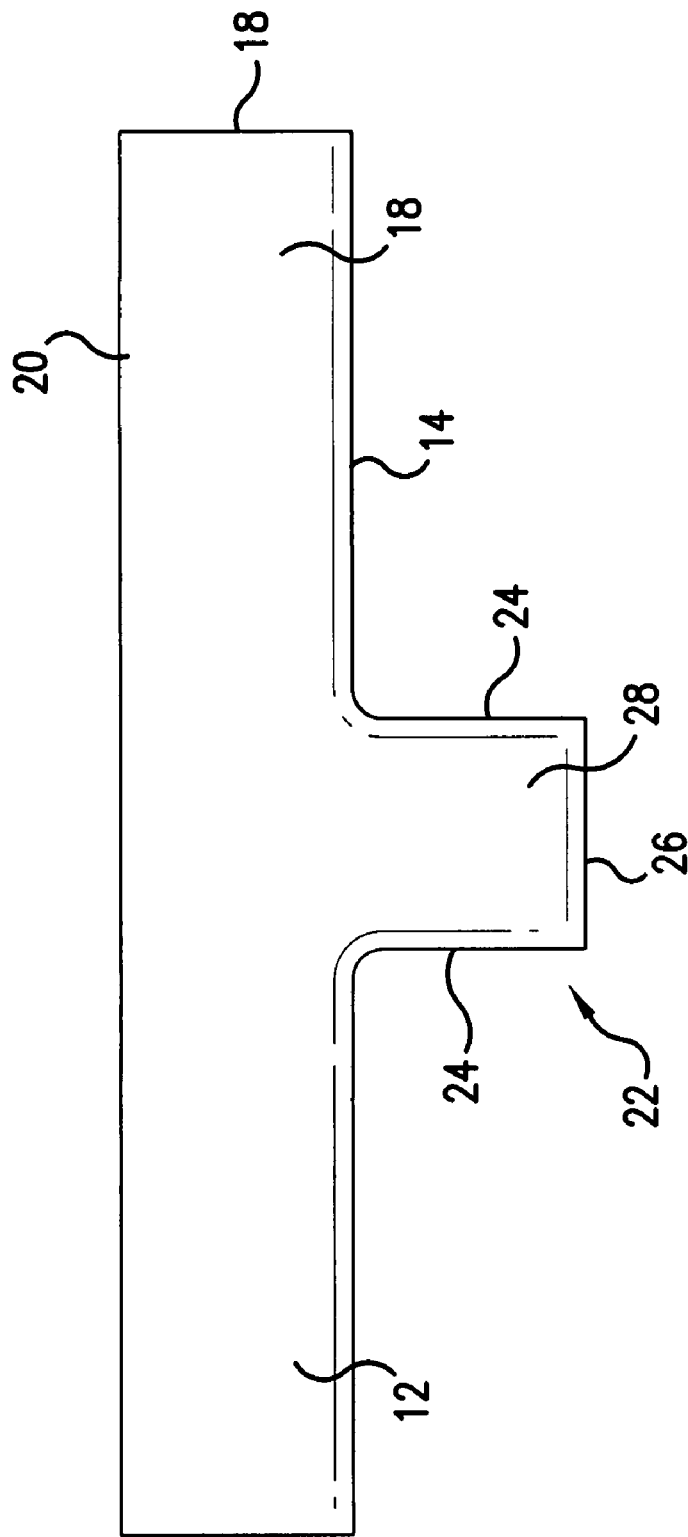
FIG. 3 is a side elevational view of the torque pad of FIG. 1.

Referring now to the drawings, wherein the showings are for purposes of illustrating preferred embodiments of the invention only and not for the purpose of limiting same, FIG. 1-3 illustrate a torque pad 10 comprising a body 12 having a first side 14, a second side 16 and a plurality of sidewalls 18. Second side 16 is surrounded by a flange 20 perpendicular to side 16 and forming an extension of sidewalls 18. First side 14 includes a key 22 having first and second parallel sidewalls 24 and an end face 26 parallel to first side 14 and first and second end walls 28 coplanar with two of the sidewalls 18. While key 22 is shown in these figures centrally located between first and second sidewalls 18, it may alternately be formed at a position offset from this central position. And, while key 22 extends in a length direction between first and second ones of the sidewalls 18, a key shorter than the width of the body 12 could also be used. The size and configuration of the key and the body will be based on the amount of torque to which the key 22 and torque pad 10 will be subjected.

Torque pad 10 is preferably formed from a superalloy such as Inconel brand alloy available from the Special Metals Corporation of New Hartford, N.Y., or a high-temperature stainless steel such as 17-4 PH or 300 series stainless steel. Such specialized materials are needed to withstand the 1200° F. or higher temperatures that will be produced during an aircraft braking operation and to transfer, together with a plurality of other torque pads, axial loads of around 45,000 pounds and torsional loads of around 30,000 foot pounds from a backing plate to a torque tube as discussed below.

Figure 10:
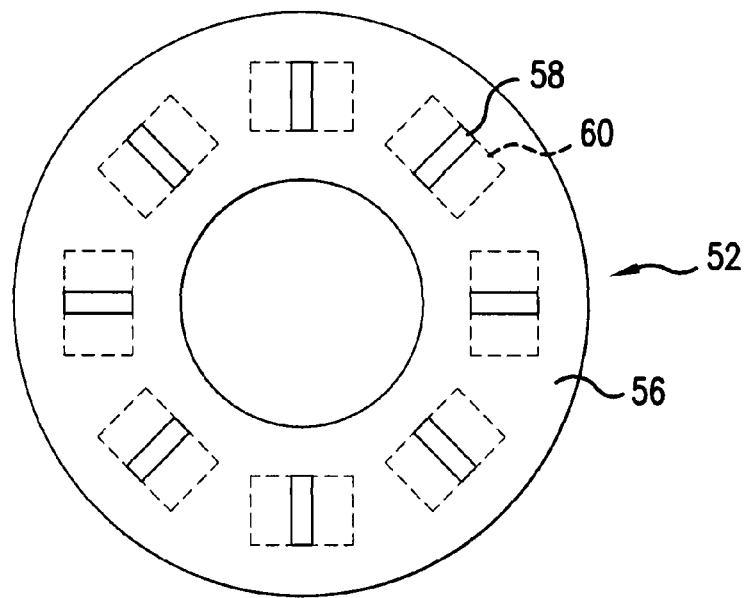
FIG. 10 is a top plan view of a backing plate having a plurality of keyways for use with the torque pad of FIG. 1.
Figure 11:
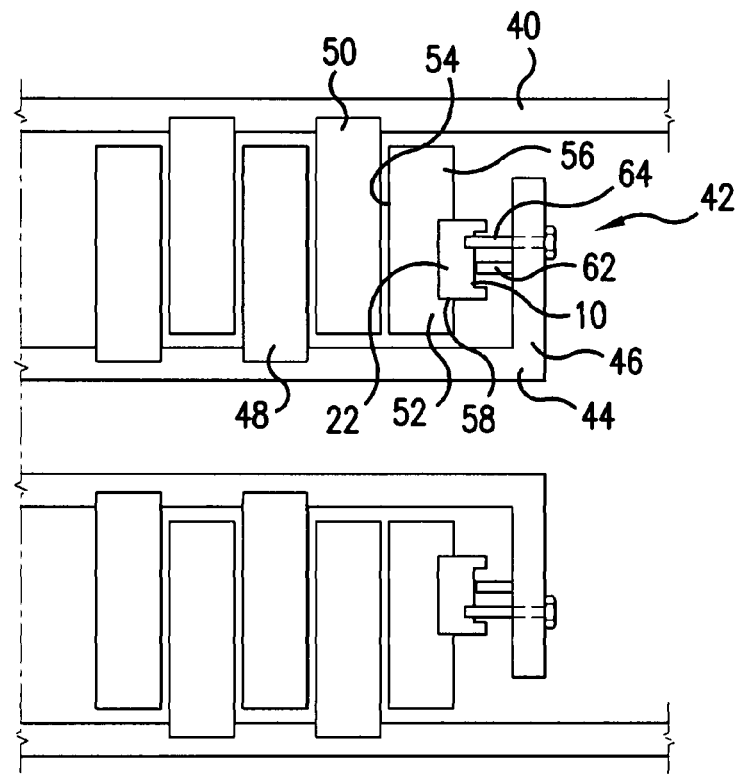
FIG. 11 is a side elevational view of an aircraft brake system including the torque pad of FIG. 1 and the backing plate of FIG. 10.

FIG. 11 illustrates a portion of an aircraft wheel 40 and a brake assembly 42 including a torque tube 44 having a flange 46. A plurality of spaced carbon stators 48 extend from the torque tube 44 and a plurality of spaced carbon rotors 50 extend from wheel 40 into the spaces between the stators 48. The stator closest to flange 46 is configured differently than the other stators 48 and comprises a backing plate 52. As illustrated in FIG. 10, backing plate 52 has a first side 54 that will contact a rotor 50 in the brake assembly 42 and a second side 56 having a plurality of radially disposed keyways 58 surrounded by contact regions 60 illustrated in dashed lines in FIG. 10. These contact regions 60 are identified for illustration purpose only and do not constitute physical features on the surface of the backing plate 52.

Flange 46 on torque tube 44 includes a plurality of projecting tabs 62 on which torque pads 10 are mounted, and one or more pins 64 secure the torque pads 10 to flange 46. Backing plate 52 is placed over torque tube 44 and moved toward flange 46 until keys 22 of the torque pads 10 are received in keyways 58 and first side 14 of torque pads 10 contact second side 56 of backing plate 52. This arrangement substantially decouples the axial and torsional loads placed on the torque pad 10. Torsional loads are absorbed by keys 22 projecting into keyways 58 while axial loads are absorbed largely by first side 14. However, this configuration reduces the size of the openings that are required in backing plate 52 thereby improving the strength of backing plate 52 over conventional backing plates while providing comparable performance. Distributing axial load over second side 56 may also allow for application of a higher axial load than in a conventional brake assembly because the second side 56 should be able to absorb a higher axial load than the inner wall of a torque pad pocket of a conventional brake assembly.

A torque pad according to a second embodiment of the present invention is illustrated in FIGS. 4 and 5. In this embodiment, a torque pad 70 comprises a body 72 having a first side 74, a second side 76 and a plurality of sidewalls 78, the second side 76 including a flange 80 forming an extension of one of the sidewalls 78. A key 82 projects from first side 74 and includes first and second sidewalls 86, one of which lies in the same plane as one of the sidewalls 78. This configuration provides benefits similar to those provided by the first embodiment of the invention and may allow for alternative methods of connection to a torque tube flange.

A torque pad according to a third embodiment of the present invention is illustrated in FIGS. 6 and 7. In this embodiment, a torque pad 100 comprises a body 102 having a first side 104, a second side 106 and a plurality of sidewalls 108, the second side 106 including a flange 110. A first key 112 and a second key 114 project from first side 104, each of which includes sidewalls 116. Torque pad 100 would be used with a backing plate (not shown) having pairs of closely spaced keyways on one surface thereof for receiving the first and second keys 112, 114 of torque pad 100.

A torque pad according to a fourth embodiment of the present invention is illustrated in FIGS. 8 and 9 and comprises a torque pad 120 comprising a body 122 having a first side 124, a second side 126, and a plurality of sidewalls 128, the second side 126 including a flange 129. A first cylindrical key 130 and a second cylindrical key 132 project from first side 124. Torque pad 120 would be used with a backing plate (not shown) having spaced pairs of circular bores for receiving the first and second keys 130, 132.

Figure 12:
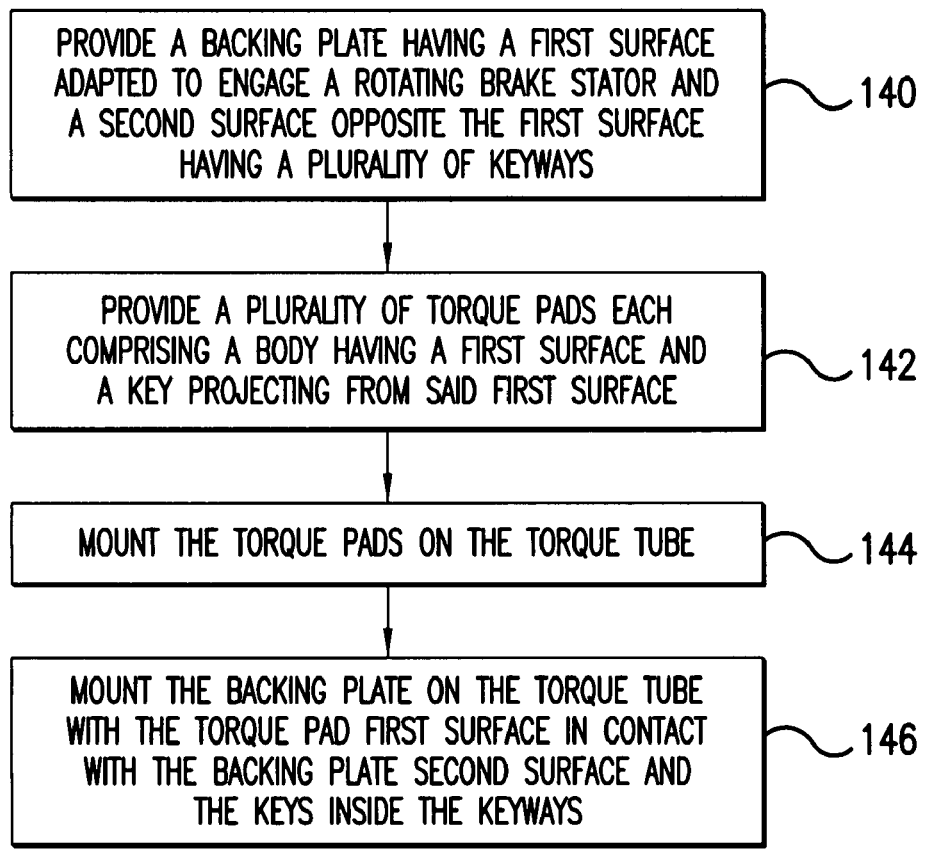
FIG. 12 is a flow chart illustrating a method of assembling a brake assembly according to one embodiment of the present invention.
Figure 13:
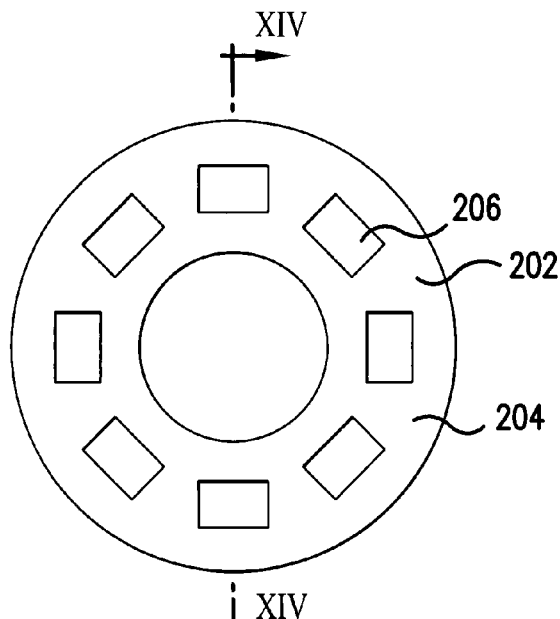
FIG. 13 is a top plan view of a conventional backing plate.
Figure 14:
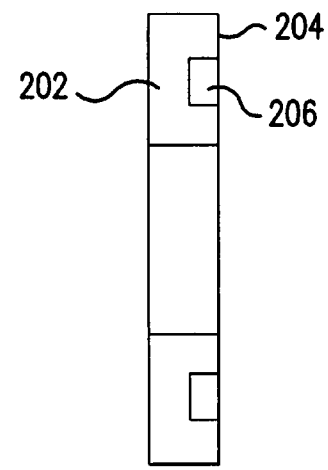
FIG. 14 is sectional elevational view taken along line XIV-XIV of FIG. 13.
Figure 15:
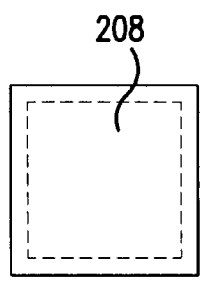
FIG. 15 is a top plan view of a conventional torque pad.
Figure 16:
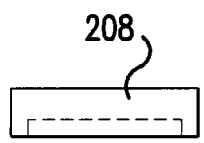
FIG. 16 is a side elevational view of the torque pad of FIG. 15.
Figure 17:
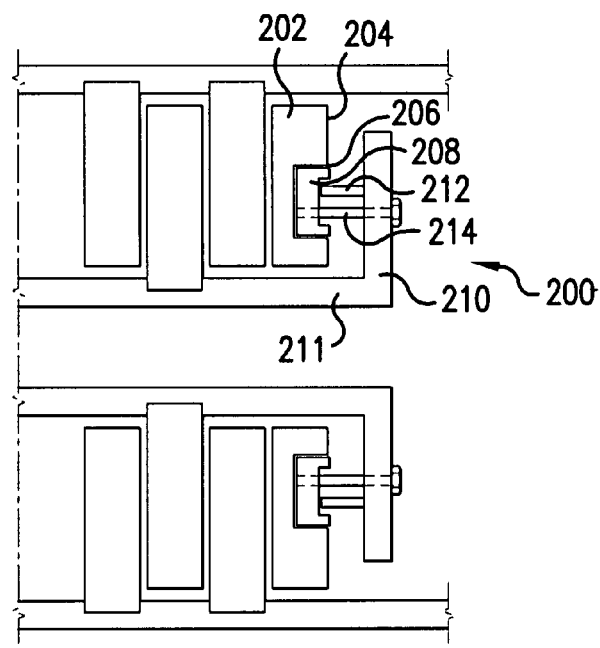
FIG. 17 is a side elevational view of a conventional aircraft braking system including the torque pad of FIG. 15 and the backing plate of FIG. 13.

A method according to an embodiment of the present invention is illustrated in FIG. 12 and includes a step 140 of providing a backing plate having a first surface adapted to engage a rotating brake stator and a second surface opposite the first surface having a plurality of keyways, a step 142 of providing a plurality of torque pads each comprising a body having a first surface and a key projecting from the first surface, a step 144 of mounting the torque pad on the torque tube, and a step 146 of mounting the backing plate on the torque tube with the torque pad first surface in contact with the backing plate second surface and the keys inside the keyways.

The present invention has been described herein in terms of several preferred embodiments. Various modifications and additions to these embodiments will become apparent to those of ordinary skill in the art upon a reading of the foregoing description. It is intended that all such modifications and additions comprise a part of the present invention to the extent they fall within the scope of the several claims appended hereto.

We claim:

1. A system comprising:
   a torque tube;
   a plurality of stators mounted on the torque tube;
   a wheel surrounding the torque tube;
   a plurality of rotors connected to the wheel, wherein each rotor of the plurality of rotors projects into a space between adjacent ones of the plurality of stators;
   a backing plate comprising a first surface facing the plurality of rotors and a second surface facing away from the plurality of rotors; and
   a torque pad coupled to the torque tube, the torque pad comprising a substantially planar surface and a key projecting outward from the substantially planar surface,
   wherein the second surface of the backing plate includes a keyway configured to mate with the key of the torque pad to couple the backing plate to the torque tube,
   wherein the backing plate defines a contact region on the second surface, the contact region extending outward from and at least partially surrounding a perimeter of the keyway on the second surface, and
   wherein, when the key and keyway are mated, a portion of the substantially planar surface adjacent the key contacts the contact region of the backing plate and, of the torque pad, only the key is positioned within the keyway.

2. The system of claim 1, wherein the key comprises a wall projecting outward from the substantially planar surface in a direction substantially perpendicular to the substantially planar surface.

3. The system of claim 1, wherein the key comprises a plurality of keys projecting outward from the substantially planar surface and the keyway comprises a plurality of keyways each configured to mate with a respective key of the plurality of keys.

4. The system of claim 1, wherein the substantially planar surface is substantially rectangular, wherein the substantially planar surface extends between a first sidewall, a second sidewall, a third sidewall, and a fourth sidewall, and wherein the key projects outward from the substantially planar surface between the first sidewall and the second sidewall.

5. The system of claim 1, wherein the torque pad comprises a superalloy or a high-temperature stainless steel.

6. The system of claim 1, wherein the key is configured to withstand a load of at least 2,500 foot-pounds at a temperature of at least 1,000 degrees Fahrenheit, wherein the load is applied to the key substantially perpendicular to the substantially planar surface of the torque pad.

7. The system of claim 1, wherein the key has a substantially cylindrical shape.

8. The system of claim 1, wherein the key has a substantially rectangular cross-section.

9. The system of claim 1, wherein the torque pad comprises a plurality of torque pads and the contact region comprises a plurality of contact regions.

10. A method comprising:
coupling a plurality of stators to a torque tube;
coupling a plurality of rotors to a wheel surrounding the torque tube such that each rotor of the plurality of rotors projects into a space between adjacent ones of the plurality of stators; and
coupling a backing plate to the torque tube via a torque pad, wherein:
the backing plate comprises a first surface facing the plurality of rotors and a second surface facing away from the plurality of rotors,
the torque pad comprises a substantially planar surface and a key projecting outward from the substantially planar surface,
the second surface of the backing plate includes a keyway configured to mate with the key of the torque pad to couple the backing plate to the torque tube,
the backing plate defines a contact region on the second surface, the contact region extending outward from and at least partially surrounding a perimeter of the keyway on the second surface,
coupling the backing plate to the torque tube via the torque pad comprises mating the key and the keyway, and
when the key and keyway are mated, a portion of the substantially planar surface adjacent the key contacts the contact region of the backing plate and, of the torque pad, only the key is positioned within the keyway.

11. The method of claim 10, wherein the key comprises a plurality of keys projecting outward from the substantially planar surface and the keyway comprises a plurality of keyways configured to mate with the plurality of keys.

12. The method of claim 10, wherein the key comprises a wall projecting outward from the substantially planar surface in a direction substantially perpendicular to the substantially planar surface.

13. The method of claim 10, wherein the key has a substantially rectangular cross-section.

14. A system comprising:
a backing plate comprising a first surface; and
a torque pad comprising a second surface and a key projecting outward from the second surface,
wherein the second surface of the torque pad is substantially planar,
wherein the first surface of the backing plate includes a keyway configured to be mated with the key of the torque pad to couple the backing plate to the torque tube,
wherein the backing plate defines a contact region on the first surface, the contact region extending outward from and at least partially surrounding a perimeter of the keyway on the first surface, and
wherein, when the key and keyway are mated, a portion of the second surface adjacent the key contacts the contact region of the backing plate and, of the torque pad, only the key is positioned within the keyway.

15. The system of claim 14, wherein the key comprises a wall projecting outward from the second surface in a direction substantially perpendicular to the second surface.

16. The system of claim 14, wherein the key comprises a plurality of keys projecting outward from the second surface and the keyway comprises a plurality of keyways configured to mate with the plurality of keys.

17. The system of claim 14, wherein the key is configured to withstand a load of at least approximately 2,500 foot-pounds at a temperature of at least approximately 1,000 degrees Fahrenheit, wherein the load is applied to the key substantially perpendicular to the substantially planar surface of the torque pad.

18. The system of claim 14, wherein the key has a substantially cylindrical shape.

19. The system of claim 14, wherein the key has a substantially rectangular cross-section.

20. The system of claim 14, wherein the torque pad comprises a plurality of torque pads and the contact region comprises a plurality of contact regions.

* * * * *